United States Patent [19]
Beck et al.

[11] Patent Number: 5,444,974
[45] Date of Patent: Aug. 29, 1995

[54] ON-BOARD AUTOMOTIVE EXHAUST CATALYST MONITORING WITH A CALORIMETRIC SENSOR

[75] Inventors: Donald D. Beck, Rochester Hills; Jayanthi Doraswamy, Flint; Oscar A. Lecea, Flushing, all of Mich.

[73] Assignee: General Motors Corporation, Detroit, Mich.

[21] Appl. No.: 88,029

[22] Filed: Jul. 9, 1993

[51] Int. Cl.⁶ ............................................. F01N 3/20
[52] U.S. Cl. ...................................... 60/274; 60/276; 60/277; 73/118.1
[58] Field of Search .................. 60/277, 276, 274; 73/118.1

[56] References Cited

U.S. PATENT DOCUMENTS

| | | | |
|---|---|---|---|
| 4,157,282 | 6/1979 | Riddel | 204/1 T |
| 4,157,948 | 6/1979 | Maurer | 204/195 S |
| 4,190,499 | 2/1980 | Pebler | 204/1 T |
| 4,428,817 | 1/1984 | Isenberg | 204/412 |
| 4,495,793 | 1/1985 | Hager | 73/23 |
| 4,663,017 | 5/1987 | Ross | 204/409 |
| 4,828,673 | 5/1989 | Maeda | 204/427 |
| 5,177,464 | 1/1993 | Hamburg | 60/277 |
| 5,265,417 | 11/1993 | Visser | 60/277 |

OTHER PUBLICATIONS

Clemmens et al., "Detection of Catalyst Performance Loss Using On-Board Diagnostics", SAE Paper 900062.
Cai et al., "Unburnt Hydrocarbon Measurement by Means of a Surface Ionisation Detector", SAE Paper 910254.
Koupal et al., "Detection of Catalyst Failure On-Vehicle Using the Dual Oxygen Sensor Method", SAE Paper 910561.
Kotzan, "On-Board Diagnostics for Emission Control Systems", SAE Paper 911215.
Bogdanoff et al., "Overview of On-Board Diagnostic Systems Used on 1991 California Vehicles", SAE Paper 912433.
Hepburn et al., "The Relationship Between Catalyst Hydrocarbon Conversion Efficiency and Oxygen Storage Capacity", SAE Paper 920831.
Cai et al., "A Catalytic Oxidation Sensor for the On Board Detection of Misfire and Catalyst Efficiency", SAE Paper 922248.

Primary Examiner—Douglas Hart
Attorney, Agent, or Firm—George A. Grove

[57] ABSTRACT

A calorimetric sensor comprising closely spaced, similarly constructed catalyzed (oxidation catalyst) and uncatalyzed members can be placed in the exhaust gas stream of an automotive engine downstream of a catalytic converter to aid assessment of the efficacy of the converter, especially when the exhaust is hot and at an appreciable steady flow rate and the engine is operating at the stoichiometric air-to-fuel ratio or lean of such ratio.

7 Claims, 8 Drawing Sheets

ON-BOARD AUTOMOTIVE EXHAUST CATALYST MONITORING WITH A CALORIMETRIC SENSOR

This invention pertains to sensors and practices for on-board monitoring of automotive exhaust gas treatment catalysts. More specifically, this invention pertains to the use of a calorimetric sensor positioned in the exhaust gas downstream of the catalytic converter for the purpose of passively and continually monitoring the oxidation efficiency of the catalytic converter.

BACKGROUND OF THE INVENTION

Catalytic converters have been used on gasoline-fueled automobiles produced in the United States since the mid-1970s for the purpose of promoting the oxidation of unburned hydrocarbons and of carbon monoxide. A few years after their introduction, the converters were adapted to promote the chemical reduction of oxides of nitrogen. At the present time, these converters typically employ small amounts of platinum and rhodium that are dispersed over a high surface area particulate carrier which, in turn, is distributed as a thin, porous coating (sometimes called a washcoat) on the wall of a ceramic monolith substrate or on the surface of a corrugated, oxidation-resistant stainless steel foil. The ceramic monolith is formed by an extrusion process providing hundreds of thin wall, longitudinal, parallel open cells per square inch of cross section, and the corrugated metal is wrapped or folded into a like configuration. These flow-through catalytic devices are housed in a suitable stainless steel container and placed in the exhaust stream under the vehicle downstream from the engine's exhaust manifold.

Under current practice, the converters are called three-way catalysts because they simultaneously effect the oxidation of carbon monoxide and unburned hydrocarbons and the reduction of oxides of nitrogen. This remarkable function is accomplished by controlling the proportions of air and fuel entering the engine such that the air-fuel ratio is continuously cycled closely about the stoichiometric air-fuel ratio. In this way, the exhaust gas passing over the catalytic surfaces of the converter is alternatively rich in oxygen and deficient in oxygen so as to promote the nearly simultaneous oxidation and reduction reactions. In some catalysts, the high surface area support material for the noble metal contains mixtures of high surface area ceria ($CeO_2$) with high surface area forms of alumina. The ceria has been demonstrated to have the capability of temporarily storing oxygen during the oxygen-rich portions of the air-fuel cycles so as to provide oxygen for the oxidation reactions when the exhaust gas is momentarily oxygen deficient.

The careful control of the engine air-fuel ratio is enabled by the use of an on-board microcomputer which monitors and controls many functions of the engine in response to driver throttle manipulations. Such control of the air-fuel ratio is also abetted by the use of an oxygen sensor in the engine exhaust stream upstream of the catalytic converter. The oxygen sensor is an electrochemical device that uses a stabilized zirconia oxygen ion conductive electrolyte with a catalyzed electrode on one surface in contact with the exhaust gas and a reference electrode on an opposite surface. This oxygen sensor produces a voltage signal that signals the engine control computer as to whether the exhaust gas is then oxygen-rich or oxygen-lean. By use of the engine control computer, the oxygen sensor and other devices to closely monitor the air supply and fuel delivery to the cylinders of the engine, the air-fuel ratio can be adjusted every second or so.

Since the function of the engine and control of its exhaust is now largely dependent upon the engine control computer module and sensors that provide it with data, electronic diagnostic systems have been adapted to assure that these systems are functioning properly. In the event that some aspect of this closely controlled system is not functioning properly, a light is illuminated in the instrument panel to inform the driver and a fault code is registered in the computer to assist service technicians. See, for example, SAE Paper 911215, "On-Board Diagnostics for Emission Control Systems", Joseph M. Kotzan.

There will soon be further requirements for an on-board diagnostic system that is capable of monitoring all components or systems for which a malfunction can impact emissions, including the oxidation performance of the catalytic converter. See also, for example, SAE Paper 910561, "Detection of Catalyst Failure On-Vehicle Using the Dual Oxygen Sensor Method", John W. Koupal et al, and SAE Paper 900062, "Detection of Catalyst Performance Loss Using On-Board Diagnostics", William B. Clemmens et al. Since this system may be called upon to diagnose the effectiveness of the catalytic converter at any time, it must be capable of functioning over at least 100,000 miles of vehicle operation. Furthermore, since automotive engines may be utilizing a variety of hydrocarbon fuels and alcohol fuels such as, for example, gasolines, diesel fuels, natural gas, methanol, ethanol and mixtures thereof, both the engine control system, the catalytic converter and the diagnostic system for the catalytic converter must be capable of functioning in combination with such a variety of fuels.

Accordingly, it is an object of this invention to provide a sensing device capable of providing an electrical signal that is directly related to the amount of oxidizable constituents in the exhaust stream exiting the catalytic converter.

It is a further object of this invention to provide such a device that is capable of monitoring the oxidation of unburned hydrocarbons or carbon monoxide in the exhaust stream and producing an electrical signal proportional to the amount of such substances present. It is an object of this invention to provide such a device that is relatively small, quickly responsive to changes in the composition of the exhaust gas and yet durable so as to be operative over 100,000 miles of vehicle operation.

It is a more specific object of the invention to provide a calorimetric sensor having two members of identical thermal mass and exhaust flow profile, one catalyzed and one uncatalyzed, such that the catalyzed member promotes the exothermic oxidation of unoxidized constituents in the exhaust gas, thereby producing a related temperature increase of the catalyzed member with respect to the uncatalyzed member.

It is a further object of this invention to provide a method of utilizing such a two member sensing device so that the temperature difference in the device is only considered for diagnostic purposes during times of vehicle operation which most likely produce reliable data with respect to the efficiency of the catalytic converter.

SUMMARY OF THE INVENTION

In accordance with preferred embodiments of this invention, the above and other objects and advantages are accomplished as follows.

Our sensor comprises two separated but closely spaced, identically sized and shaped members adapted to carry a washcoat of high surface area, heat-resistant oxides. A suitable and preferred example of such members are two identical foils of an oxidation-resistant, high temperature-withstanding aluminum-containing stainless steel alloy where the foils are about 0.125 millimeter thick and (e.g.) about 1 millimeter by 0.5 millimeter on a side. Each foil is coated with a thin layer of finely divided particles of high surface area alumina-ceria mixture which is applied to and calcined onto the metal foil surface. One of the washcoated foils is then impregnated with a solution of a suitable noble metal salt so that, upon calcining, an oxidation catalyst (e.g., platinum) surface is formed. The catalyzed and uncatalyzed washcoated foils are then bonded in electrical conductive contact with suitable electrical leads such as separate thermocouples and assembled in a suitable housing for mounting in the exhaust gas stream downstream of the catalytic converter. The hot exhaust gas exiting the converter quickly heats the sensor to the temperature of the exhaust. If there are oxidizable constituents in the exhaust such as carbon monoxide, unburned hydrocarbons or hydrogen and an adequate supply of oxygen, then the oxidation occurs on the catalyzed surface. The exotherm of these reactions heats the catalyzed member above the temperature of the uncatalyzed member, and the temperature difference is utilized to produce an electrical signal that is directly related to the amount of the residual oxidizable constituents in the converter-treated exhaust.

The purpose of our sensor is to determine whether the catalytic converter is performing to governmental requirements or other specifications with respect to oxidation of CO and HC. There are vehicle and engine operating modes producing exhausts that are not necessarily definitive of converter operation. Therefore, some selectivity is required in accepting data from the sensor.

In accordance with the practice of our invention, we prefer that the electronic signal data from our sensor be considered suitable for converter diagnostic purposes when the temperature of the sensor is within specified limits, when the exhaust gas flow rate is at an appreciable above-idle to mid-range flow, and when the engine air-to-fuel ratio is at or slightly above the stoichiometric point. For example, in general, we prefer that the temperature of the sensor in the exhaust gas be between about 300° C. and 450° C., that there be appreciable exhaust gas flow, and that the air-fuel ratio be at or within a few percent of the stoichiometric air-to-fuel ratio on the lean side. We obtain base line data for the operation of a fresh or newly broken-in converter and, using our sensor analysis practice, we can determine the performance of the converter during regular driving operations when the stated conditions are suitable, during the federal test procedure (FTP) when the stated conditions are suitable or at steady cruising operation of the vehicle.

BRIEF DESCRIPTION OF THE DRAWINGS

Other objects and advantages of our invention will be appreciated from a derailed description thereof which follows. Reference will be had to the drawings in which.

DETAILED DESCRIPTION OF A PREFERRED EMBODIMENT

Current automotive vehicles capable of meeting stringent limitations on fuel economy and exhaust gas constituents operate using engine control modules that include microcomputer chips and associated microprocessors that receive data from a number of sensors (transducers) located throughout the vehicle. For example, there are sensor or transducers for throttle position, vehicle speed, coolant temperature, manifold absolute pressure, mass air flow, intake air temperature, knock detection and exhaust oxygen content. The engine control computer uses this and other data to control engine operation to enhance fuel economy and reduce exhaust emissions.

Figure 1:
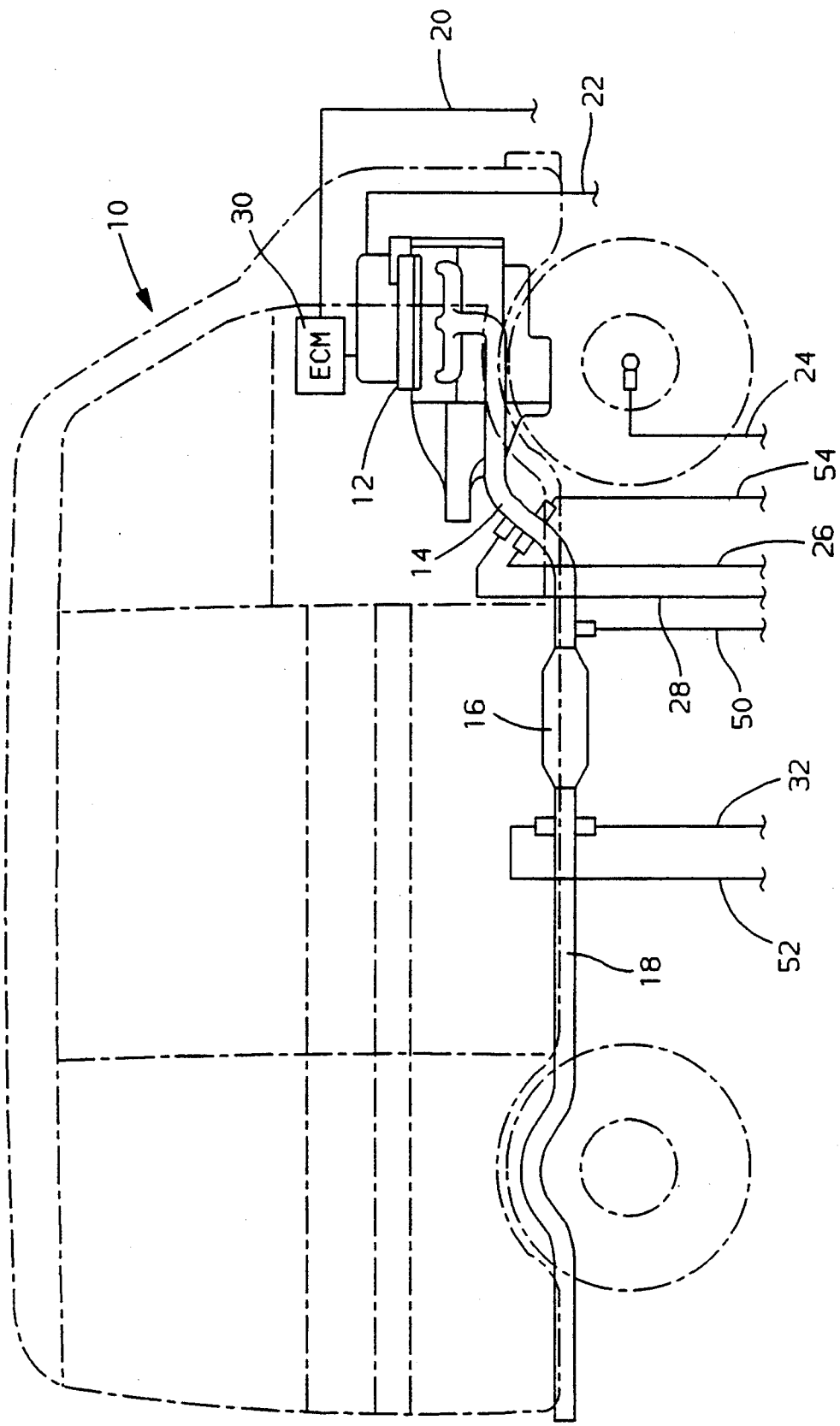
FIG. 1 is a schematic of a van and its exhaust system depicting the several sensors used in the testing of our sensor and its use.

FIG. 1 depicts a midsize van 10 in skeleton outline with a solid schematic outline of the engine 12 and its exhaust pipe 14, a catalytic converter 16 and a tailpipe 18. We have tested an embodiment of our sensor on such a vehicle. Our vehicle employed sensors that measured the engine revolutions per minute (RPM) (sensor not shown, indicated at 20), manifold absolute pressure 22, vehicle wheel speed 24, engine out exhaust temperature 26 and the oxygen content 28 of the exhaust gas. It also had its production specified engine control module 30 (ECM). In normal operation of the van 10, its engine control module 30, oxygen sensor 28 and other sensors operate to supply the cylinders of the engine with a combustible mixture of gasoline and air that is close to the stoichiometric mixture. As explained above, this practice enables a single catalytic converter 16 utilizing a mixture of dispersed platinum and rhodium to promote both the oxidation of HC and CO and the reduction of $NO_x$ constituents in the exhaust gas. This practice is generally applicable whether the fuel is gasoline, diesel fuel, methanol, ethanol or mixtures of such alcohols with hydrocarbon fuels or natural gas fuel. The nature of the catalysts that have proven utility in the treatment of such exhaust gas mixtures over the past 15-plus years of experience in the United States has indicated that such near-stoichiometric mixtures be burned in the engine.

Rather than attempt to control the air-fuel mixture at a single specific air-fuel ratio value, the ECM 30 continually cycles the ratio about its stoichiometric value. Data from the oxygen sensor 28 continually informs the computer as to the oxygen content of the exhaust. This data is used by the computer in the ECM to vary the air-fuel ratio such that its net ratio is close to the stoichiometric value. The engine computer receives $O_2$ data every half-second or so and controls the air and fuel flow accordingly. Fuel injectors accurately meter the fuel. Air flow is measured utilizing a mass air flow sensor (not shown), or air flow to the engine induction system is calculated using data from the manifold absolute pressure sensor 22 and engine RPM sensor 20. In any event, present technology actually utilized in vehicles enables the engine to be controlled by its ECM 30 so as to operate as described.

The oxygen sensor 28 is an electrochemical device typically utilizing a stabilized zirconia solid electrolyte. The sensor electrode exposed to the exhaust gases has a noble metal surface which promotes the formation of an equilibrium mixture of oxygen and combustible materials in the exhaust at the surface of the electrode. Such equilibrium oxygen content is lower than the actual $O_2$ content of the exhaust upstream of the catalytic converter, but it is a value that better represents the proportion of $O_2$ in the air-fuel mixture inducted into the cylinders of the engine. The other electrode of the oxygen sensor is usually exposed to a reference gas such as air. The voltage generated by such electrochemical sensor 28 is a measure of the oxygen content of an equilibrium mixture of the exhaust gas approaching the catalytic converter 16. The engine control module 30 reacts to this signal from the oxygen sensor 28.

The three-way catalytic converter 16 in the exhaust system of van 10 contained highly dispersed, extremely fine particles of platinum and rhodium on a particulate washcoat material. The washcoat materials were finely divided particles of mixtures of high surface area alumina and ceria. In our tests of our sensor practice, we used two such production catalysts (one at a time) each using an extruded cordierite monolith substrate of 170 in$^3$ size. As will be described, one converter was a fresh converter and the other an aged converter.

Figure 2A:
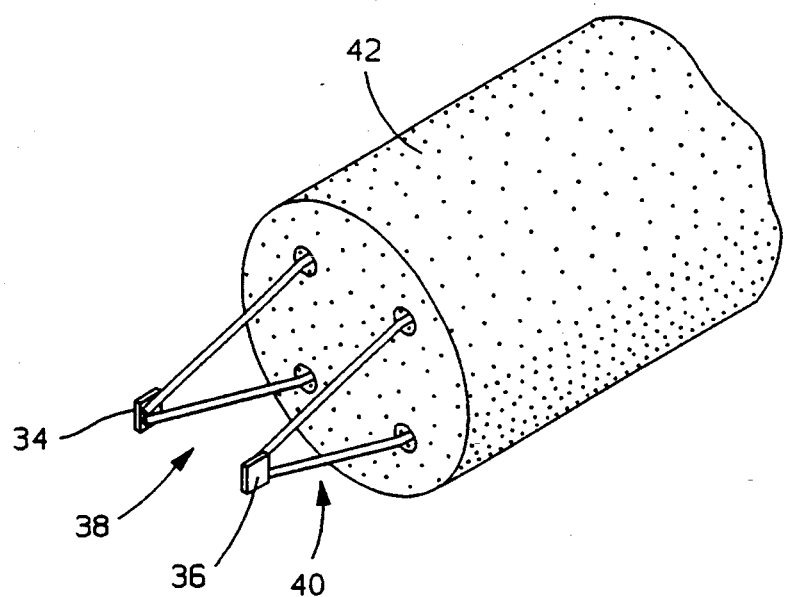
FIGS. 2A and 2B are schematic diagrams of a calorimetric sensor suitable for use in the practice of our invention.
Figure 2B:
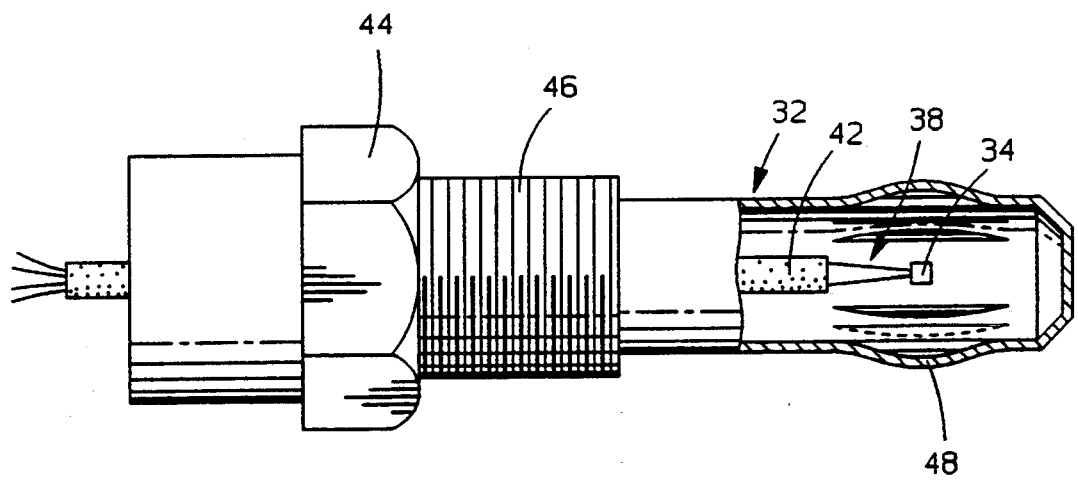

In accordance with our invention, we employ a post catalytic converter calorimetric sensor indicated at 32 in FIG. 1. FIGS. 2A and 2B illustrate in more detail a calorimetric sensor 32 of the type we have employed in tests of a midsize van 10 equipped with instrumentation like that illustrated in FIG. 1. Our calorimetric sensor 32 comprises two small rectangular metal foil pieces 34 and 36 (each 1 millimeter long by 0.5 millimeter wide by 0.125 millimeter thick) of an aluminum-containing stainless steel composition. The nominal composition of the foil was, by weight, 20% Cr, 5% Al, 0.35% max Ni, 0.35% max Ce, 0.1% La and the balance Fe. Such alloy foils are commercially available and in use as a substrate material in catalytic converters. The foils are heated in an oxidizing environment, air or five percent oxygen-nitrogen mixtures, at 1000° C. to promote the growth of small aluminum oxide whiskers on the surface. These whiskers on the foil surface are preferable because they provide a means of physically bonding the catalytic materials to be subsequently applied. This surface oxide layer also improves the resistance of the base metal to oxidation in the hot exhaust gas stream.

To this support material, any suitable catalyst carrier washcoat may be applied. In the case of our following tests, we employed a high surface area gamma alumina washcoat powder mixture impregnated with lanthanum and cerium oxides. The loadings of cerium and lanthanum were two percent and one percent by weight, respectively (as $CeO_2$ and $La_2O_3$). Finely divided washcoat was applied to the surface of the foil and calcined on its surface. A solution of an acid platinum chloride ($H_2PtCl_6$) was prepared and used to impregnate the washcoat of one of the sensor elements at a metal loading of about 1 weight percent on the washcoat. The impregnated washcoat was then calcined at 500° C. in flowing air. The resulting catalyzed 34 and uncatalyzed 36 foils were calcined at 600° C. in flowing air and then treated in a reducing gas (five percent hydrogen/nitrogen) at 600° C. for one hour.

As further depicted in FIGS. 2A and 2B, the uncatalyzed 36 and catalyzed 34 washcoated foils were each spot welded to separate thermocouples 38, 40 at the junction of the thermocouples 38, 40, and the four thermocouple leads were threaded back through a suitable ceramic body 42 which maintained the leads and the catalyzed and uncatalyzed foils in closely spaced position. The thermocouples 38, 40 each consisted of a chromel lead and an alumel lead. The sensor elements carried by the ceramic tube were then inserted into the package shell 44 of a production-type oxygen sensor. As seen in FIG. 2B, the metal package contains a threaded portion 46 for engagement into the tailpipe in the exhaust system of the vehicle. The sensor foils 34, 36 were protected by a louvered housing member 48. The spacing of the washcoated foils 34, 36 was about seven millimeters, and it is seen that they have substantially equal mass except for the very low mass of the platinum particles and essentially same profile to the flow of the exhaust stream that engages them within the sensor package 44.

The midsize van 10 was powered by a 4.3 liter V-6 engine 12 fueled with gasoline. The cylinders of the engine were supplied by fuel with a port injected fuel injection system. As illustrated schematically in FIG. 1, the van 10 was further instrumented to measure engine out 26, catalyst front bed 50 and tailpipe exhaust 52 temperatures, manifold absolute pressure 22, engine RPM 20, wheel speed 24 and engine out exhaust flow 54. The exhaust system was equipped with pipe thread ports in the exhaust pipe and tailpipe designed to accept a production heated oxygen sensor 28 in front of and a subject calorimetric sensor 32 directly behind the main underfloor catalytic converter 16.

Tests were conducted with the van 10 placed on a chassis dynamometer, and the exhaust gas was sampled near the calorimetric sensor 32 placed behind the converter 16 and analyzed for carbon monoxide (CO), hydrocarbons (HC) and nitrogen oxides ($NO_x$) concentrations using conventional gas analyzers. The exhaust was monitored by the analyzers during the warmed-up portion of the federal test procedure (FTP) test (hot 18 cycles) and during two steady speeds, 30 miles per hour and 40 miles per hour. Two 170-inch cubed production monolith converters were used alternatively in the tests. The first converter was used after a brief break-in period to stabilize the activity, while the second converter was aged for 100 hours using the rapid aging test (RAT H) schedule H with a peak temperature of about 1000° C. The FTP hydrocarbon efficiency obtained using the fresh converter was near 97 percent, while the FTP HC efficiency of the RAT H aged converter was 75 percent.

Figure 3A:
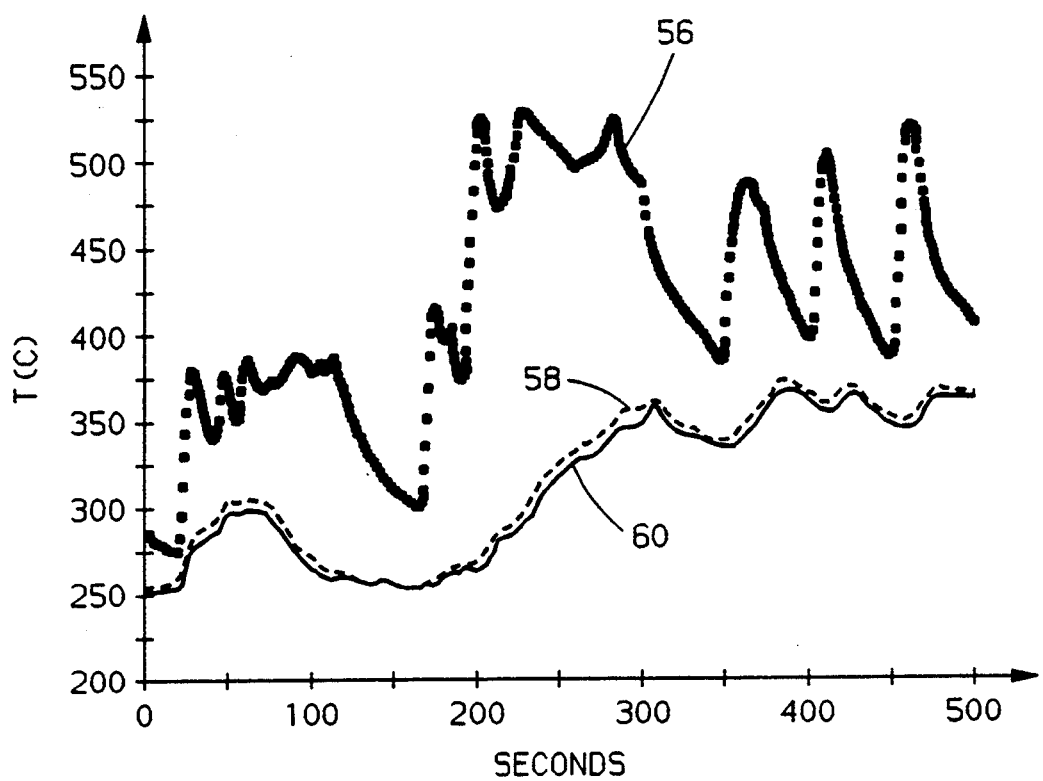
FIG. 3A is a graph of engine out (Eo) temperatures and calorimetric sensor element temperatures vs. time during a portion of the FTP test.
Figure 3B:
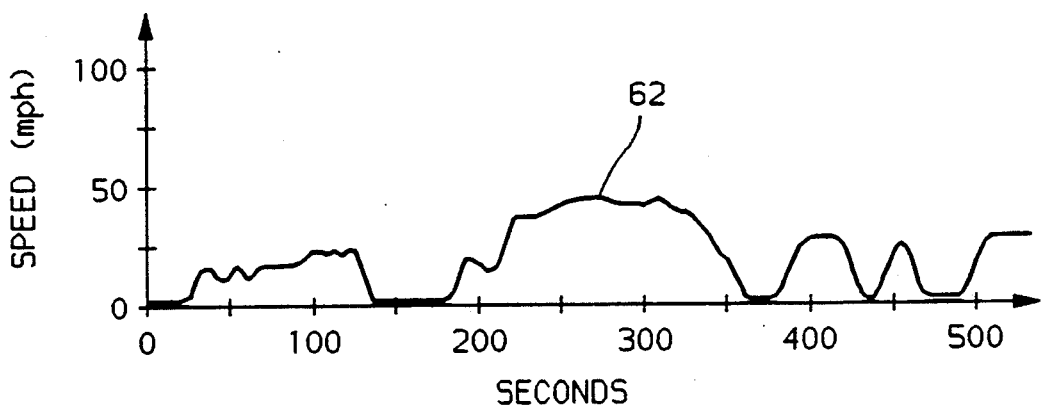
FIG. 3B is a graph of vehicle wheel speed vs. time during the FTP test.

We operated the van 10 on the dynamometer using the first five cycles of the FTP (after warm-up) with the aged converter installed on the vehicle. FIG. 3A shows (y-axis) the engine out temperature (Eo) 56 and the temperatures (58 catalyzed and 60 uncatalyzed) (thermocouple values) of the catalyzed 34 and uncatalyzed 36 elements of the calorimetric sensor 32, all as a function of time (x-axis) for the first five cycles of this test. Shown at the y-axis of FIG. 3B is the corresponding wheel speed 62 of the vehicle at the same times (x-axis). Data was recorded at a rate of two points per second during the 500 second test. It is seen that the temperatures (58, 60) of both sensor elements roughly correspond to the change in the exhaust out (Eo) temperature 56 but, of course, are cooler than the absolute temperature of the exhaust. There is a gradual warming trend in the sensor elements. The temperature 58 of the catalyzed element 34 is greater but more erratic than the uncatalyzed element 36 for much of the time. This suggests short-lived bursts of HC and CO not reacted in the catalytic converter 16 are reacted on the catalyzed element and consequently transferring heat to this element.

Figure 4A:
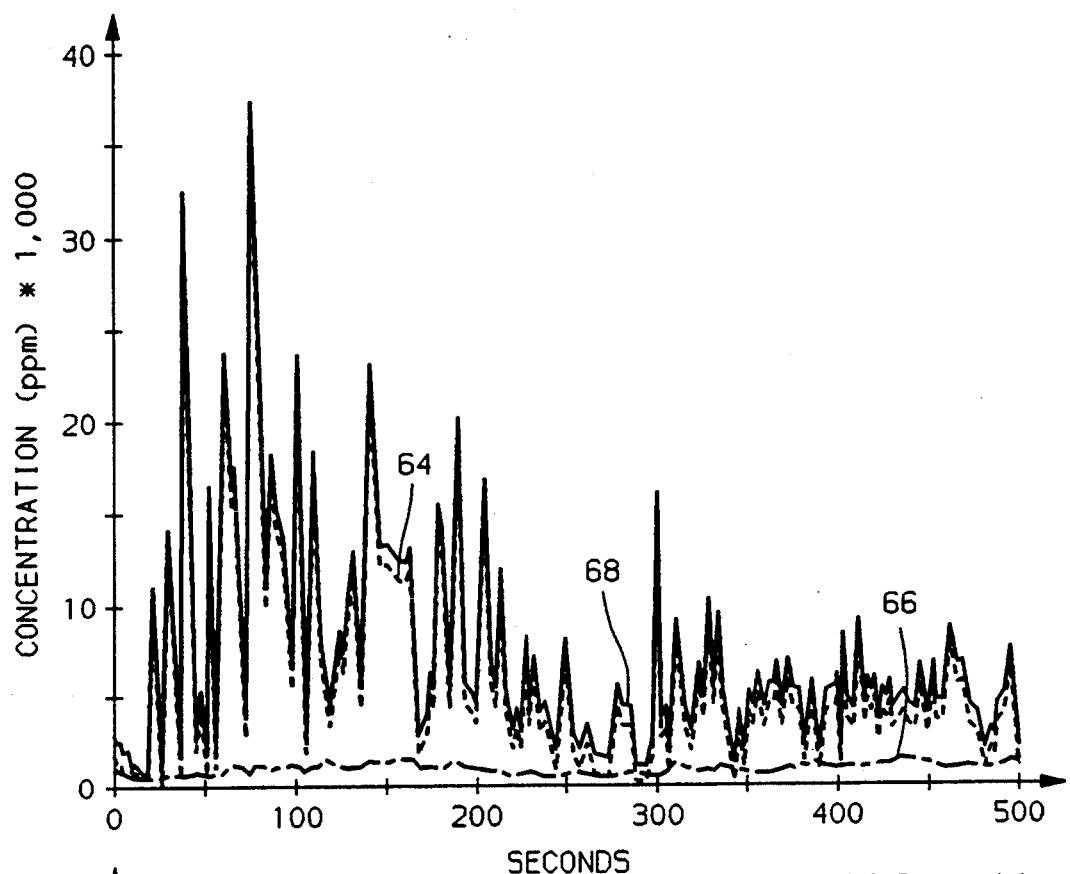
FIG. 4A is a graph including CO+HC, HC and CO concentration vs. time during the FTP test of FIG. 3.
Figure 4B:
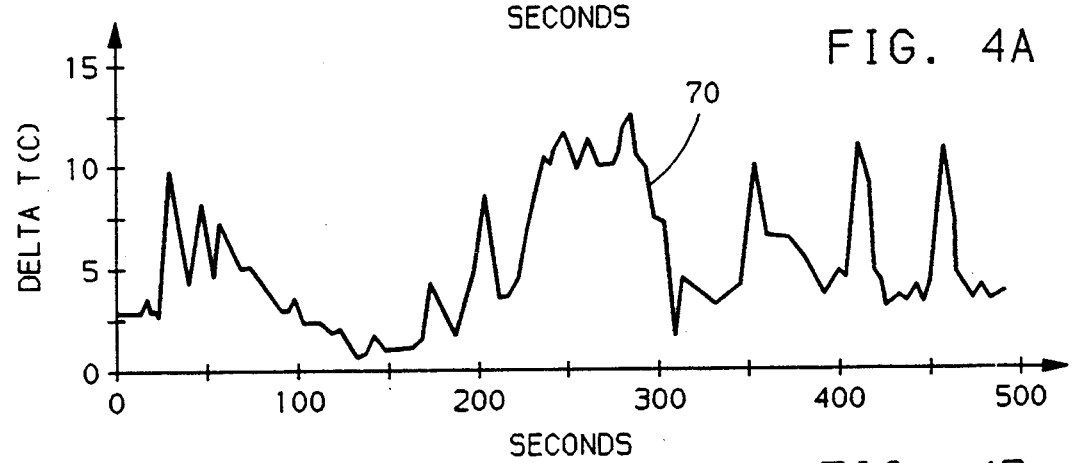
FIG. 4B is a graph of calorimetric sensor output vs. time during the FTP test.
Figure 4C:
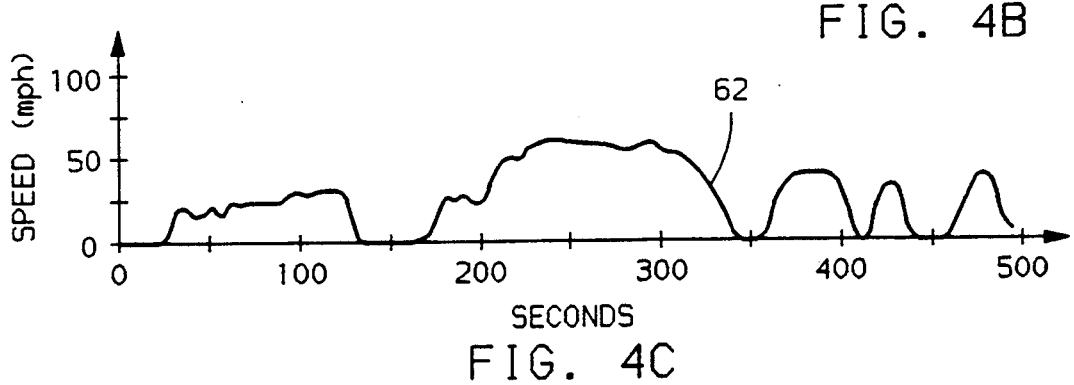
FIG. 4C is a graph of vehicle wheel speed vs. time (a repeat of FIG. 3B for convenience).

The concentrations of CO (64, dashed line), HC (66) and CO+HC (68, solid line) (gas analyzer data) are shown in FIG. 4A as a function of time during the same five hot cycles of the warmed-up FTP. These compositional traces verify the transient nature of the emissions during this driving schedule and that the contaminants are dominated by CO on the basis of concentration alone. The concentration of $NO_x$ (measured but not shown in 4A) is very low even relative to HC. $H_2$ is known to be present in the exhaust. Its concentration is not well characterized since it is not routinely measured. FIG. 4B shows the net signal 70 (vs. time during the five cycles) obtained from the calorimetric sensor 32 taken as the difference ($\Delta T$, °C.) between the catalyzed element temperature 58 (FIG. 3A) and the uncatalyzed element temperature 60 (FIG. 3A). In this gross comparison, there is no apparent correlation between the sensor signal 70 and CO (64) or HC (66) emissions. FIG. 4C is a repeat of FIG. 3B (for convenience) showing the vehicle wheel speed vs. time during the test.

We realized that changes in vehicle speed with corresponding episodes of acceleration and deceleration produce rapid changes in exhaust temperature and exhaust composition. The mass and thus the thermal inertia of our sensor was small. Still, it was affected by so many types of thermal events simultaneously, and it could not be expected to provide a direct and simple correlation to post converter HC and CO content during all vehicle operating modes. Nonetheless, we realized that the simplicity and durability of our sensor could still be well utilized if we were selective in how we took notice of its output.

In order to obtain a more useful correlation between the output of our simple and robust calorimetric sensor and the carbon monoxide or carbon monoxide plus HC concentration in the exhaust, we define the following criteria based on exhaust conditions for selecting data that will conform to the CO and HC content of the exhaust. We accept data only when (1) the temperature of the sensor is within specified limits, (2) the flow rate of the exhaust gas is within specified limits and at such times the air-to-fuel ratio is at or above the stoichiometric point. Using the sensor illustrated in FIGS. 2A and 2B, we found the best fit of sensor data with CO concentration when the exhaust had heated the uncatalyzed sensor member to between 300° C. and 450° C. We used a mass flow meter to measure the total exhaust flow rate. The meter scale was from 0 to 100 arbitrary units with typical exhaust flow rates ranging from 10 units at engine idle (about 1.5 grams/sec exhaust flow) to 100 units at the highest flow rate (15 grams/sec) experienced during a full FTP. We accepted data only when the flow rate range was from 10 to 50 units (arbitrary) on the scale.

Figure 5:
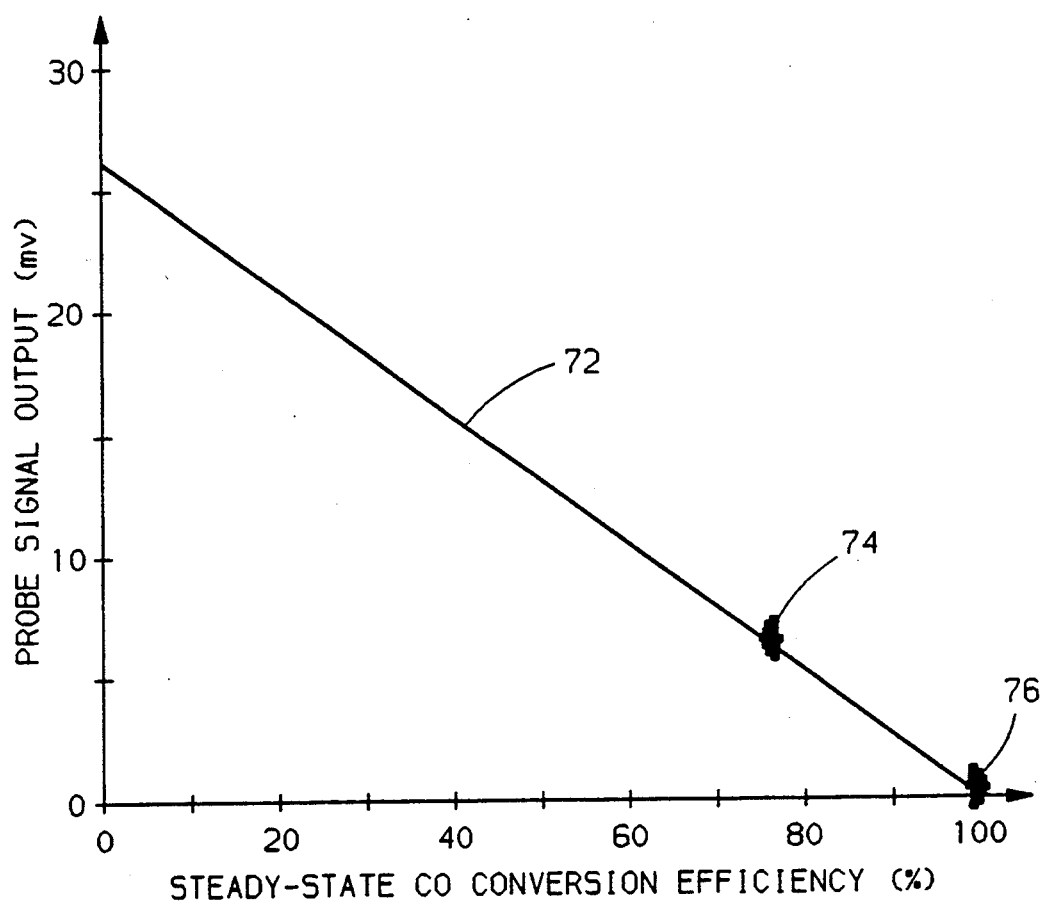
FIG. 5 is a graph of calorimetric sensor output (mv) vs. steady state CO conversion efficiency for a fresh converter and an aged converter.

We recognize that our sensor and diagnostic practice may be required to assess the efficiency or performance of the catalytic converter during widely differing driving conditions. In one common driving situation, e.g., we find a good correlation between CO conversion efficiency of the converter and sensor data is obtained at steady speed cruise conditions. FIG. 5 is a graph showing the signal output 72 of our sensor in millivolts versus steady state CO conversion efficiency during the operation of the van at a 30 mile per hour cruise mode of operation. In this mode, the temperature of the uncatalyzed foil of the sensor was 370° C., the exhaust flow rate was 30 units (arbitrary scale) and the air-to-fuel ratio was net lean. The cluster of data points at 74 was for the aged converter (see above), and the data points clustered at 76 for the new, broken-in converter. We view this test practice and sensor as a reliable diagnostic tool for converter CO oxidation performance.

Figure 6A:
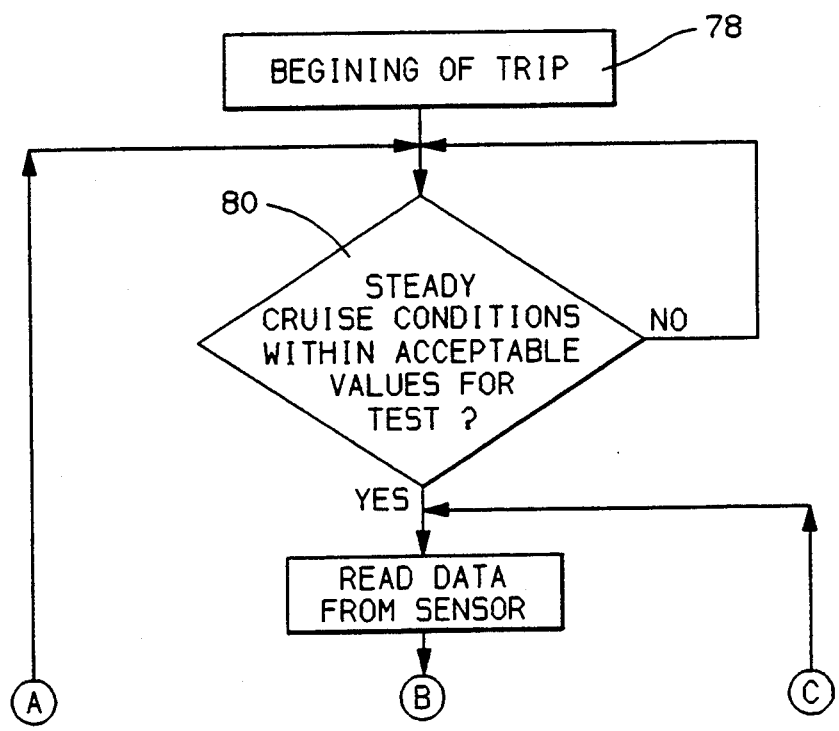
FIGS. 6A and 6B present a logical flow diagram for computer testing, collecting and filtering calorimetric sensor data points for catalytic converter diagnosis during a steady state vehicle operation mode.
Figure 6B:
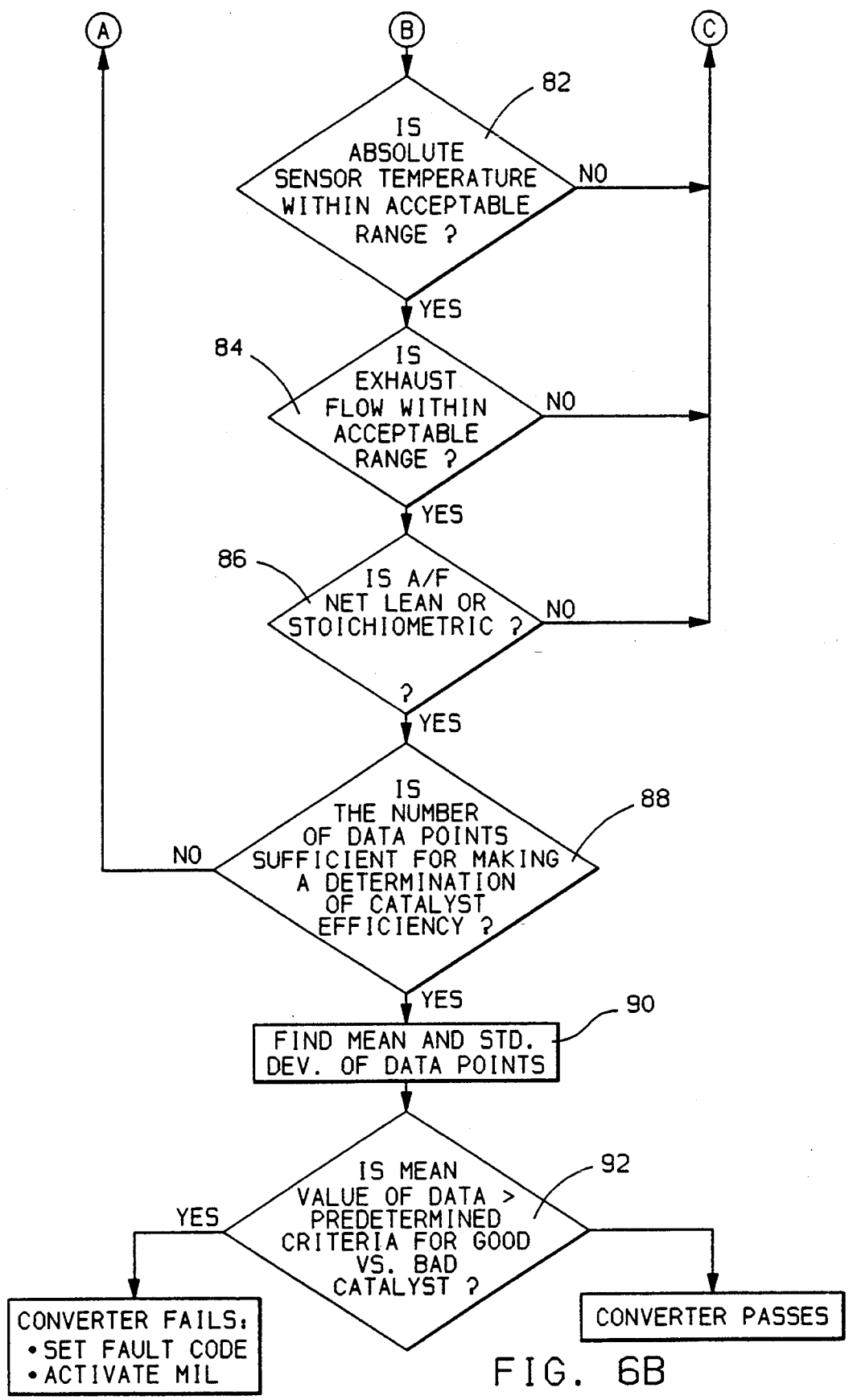

FIGS. 6A and 6B present a flow chart describing how data points would be collected, filtered and used to make a diagnosis for such a steady state cruise test of the oxidation efficiency of the converter. In accordance with this practice, the computer in the ECM 30 of the vehicle would be programmed to periodically check after vehicle startup (block 78) as to whether the vehicle was operating under steady cruise conditions (block 80) suitable for the cruise test of the converter 16. Such suitable conditions could include, e.g., a vehicle speed in the range of 30 to 40 mph with the speed not changing more than 0.5 mph over a period of a minute or more. If such conditions were not then met, the conditions would be tested again later.

If the steady state cruise conditions are found acceptable, the computer will then test sequentially for sensor temperature (block 82), exhaust flow rate (block 84) and air-to-fuel ratio (block 86). The acceptable values may be those given above as examples or others deemed to be suitable by the manufacturer. Any rejection starts the process over again. If suitable conditions are found, sensor data will be accepted and collected (block 88) while the testing of conditions is continued.

Upon finding continually suitable test conditions, a suitable number of data points are collected (block 88) unless the test is aborted due to an early change in vehicle and exhaust conditions. At the completion of an acceptable test, the data are analyzed (block 90) and a decision made (block 92) as to catalyst performance. If the converter passes, the testing may be done again after a suitable period of vehicle operation. If the converter fails, a fault mode is stored in the computer memory and a malfunction indication light (MIL) illuminated on the instrument cluster to alert the vehicle owner.

Our sensor and test practice must also be applicable during other operating modes of the vehicle, i.e., at other than steady state operation. In these circumstances, we can employ, e.g., a data testing and filtering process like that depicted in schematic form in FIGS. 7A–7D. The algorithm would be carried out by the engine control computer and would be used to select operating data from the sensor 32 during those modes of operation of the vehicle that may be required by the federal or state regulation or selected from normal driving habits of the vehicle owner. While the steady state operation lends itself best to the use of sensor data, the data may also be selected during portions of an agency-prescribed test procedure or during every day driving patterns of the owner on the basis of the three criteria defined above. The sensor temperature data and the exhaust flow data may be adapted to the specific sensor construction and composition. Since the sensor is exposed to continuously and rapidly varying exhaust gas flow rates, temperatures and compositions, each bit of data from a sensor such as that illustrated in FIG. 2 will not precisely correlate with the then carbon monoxide or carbon monoxide plus hydrocarbon content of the exhaust gas. However, if the data is selected in accordance with our practice and is evaluated statistically by the engine control computer over a period of operation, the averaged result is reliable in establishing the efficiency of the converter.

Figure 7A:
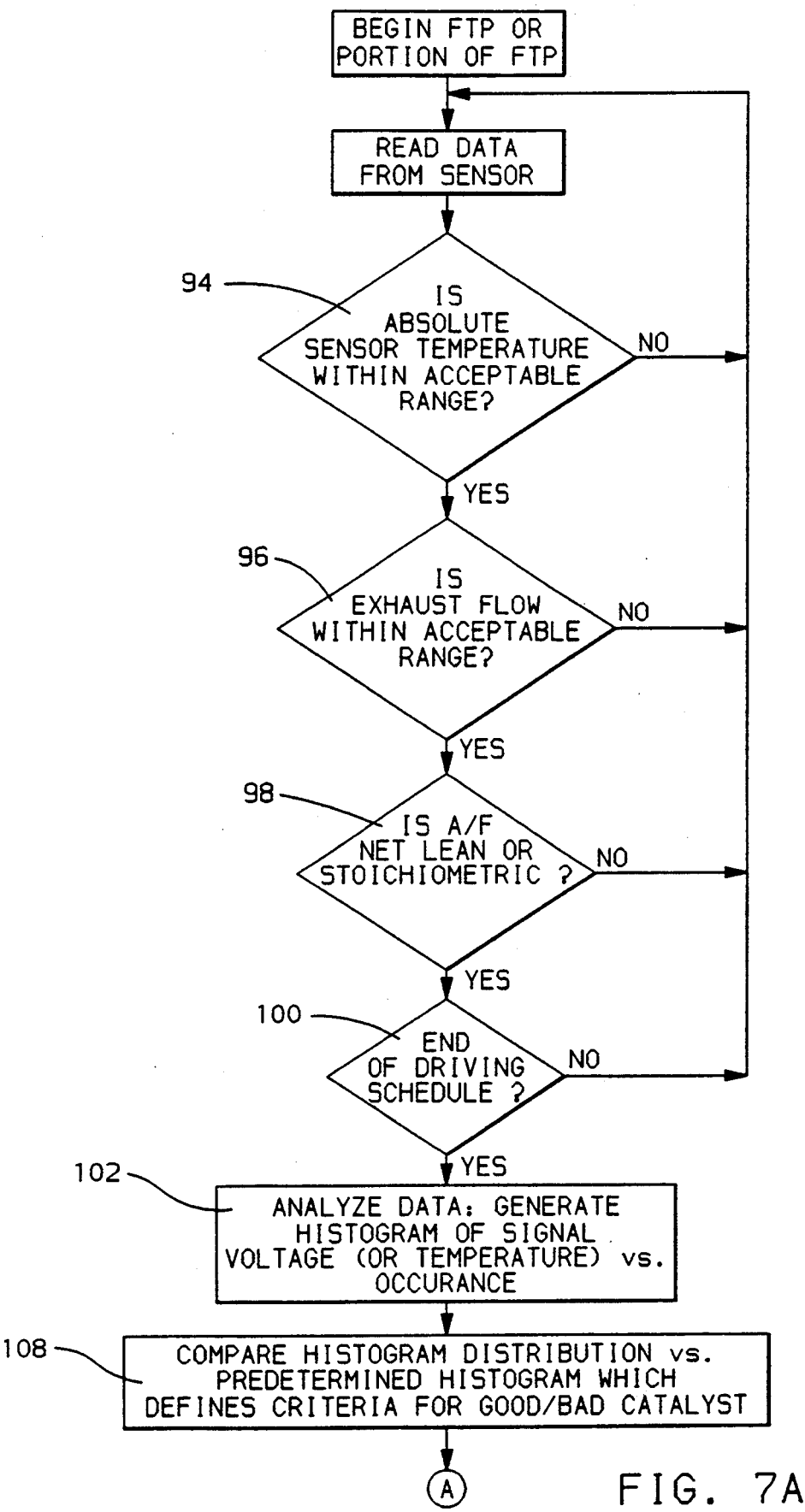
FIGS. 7A and 7B are a logical flow diagram for computer testing, collecting and analyzing calorimetric sensor data points for diagnosis during a Federal Test Procedure or other non-constant speed mode of operation.
Figure 7B:
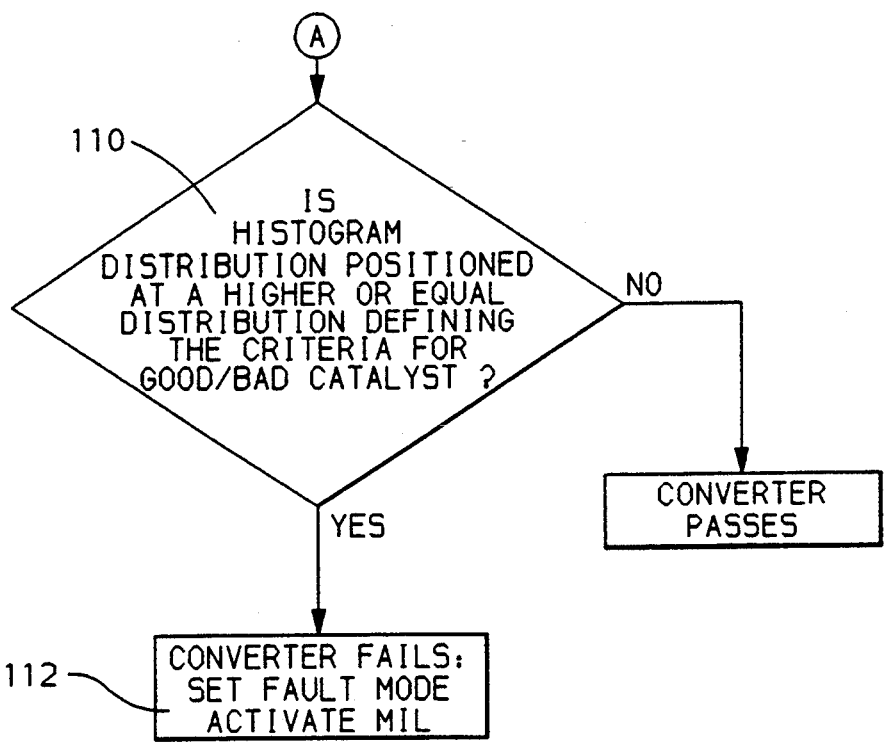

FIGS. 7A and 7B present a flow chart of computer data testing, collection and analysis for such varied modes of vehicle operation as might be encountered in an FTP schedule or the like. Data from vehicle sensors are collected by the ECM and tested for absolute sensor temperature (block 94), exhaust flow (block 96) and air-to-fuel ratio (block 98) throughout a dynamometer set driving schedule period (block 100) or other predetermined period. This portion of the data testing practice and data collection period analysis is like that of the practice illustrated in FIGS. 6A and 6B.

Figure 7C:
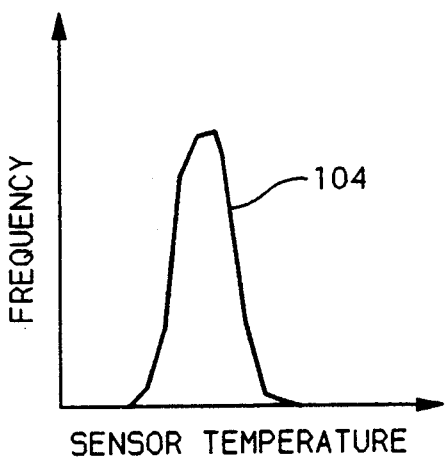
FIGS. 7C and 7D are histogram distributions of calorimetric sensor data used in the algorithm depicted in FIGS. 7A and 7B.
Figure 7D:
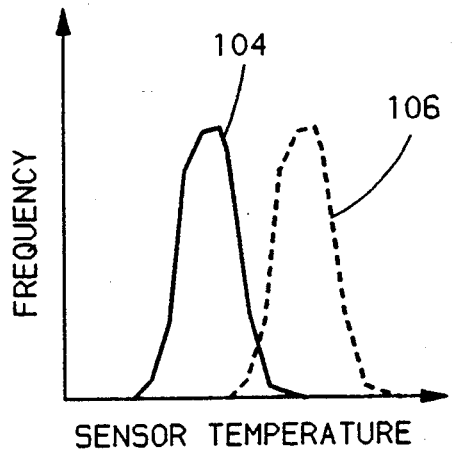

Once a set of data points are collected, they must be analyzed because the variation in vehicle speed and other operating parameters produces significant variations in calorimetric sensor output. A suitable mode of analysis is illustrated by reference to FIGS. 7C and 7D as well as 7A and 7B. At block 102, the computer generates a histogram distribution of the calorimetric sensor output (e.g., voltage or resistance) reflective of the temperature difference between the catalyzed foil and uncatalyzed foil. A histogram plot 104 of sensor ΔT (x-axis) vs. frequency of ΔT value (y-axis) is illustrated in FIG. 7C. The ECM has stored in its ROM a histogram distribution 106 for sensor ΔT data for a good/bad catalyst, i.e., one that just passes a standard (see FIG. 7D). The generated histogram data 104 is compared with the stored histogram 106 in block 108. If the test data histogram distribution is at an equal or higher temperature value, the catalyst fails (block 110). If the test data 104 is at a lower temperature than standard data 106, the catalyst passes and the test is repeated later.

In the event the catalysts failed (block 112), the fault mode is set and the MIL activated.

In accordance with the practice of our invention, other sensor designs may be employed. For example, instead of a simple two-element sensor such as that depicted in FIG. 2, we may have a plurality of elements, both catalyzed and uncatalyzed (preferably an equal number of both), that are arranged and adapted as a thermopile. In this way, a larger voltage signal may be obtained. However, it would require a slightly larger mass of the sensor which would slow the reaction time to changing exhaust temperatures and conditions. In general, we prefer to use a high temperature oxidation-resistant surface like the aluminum-containing stainless steel described above that has been provided with a suitable washcoat (uncatalyzed member) and washcoat and catalyst in the case of the catalyzed element.

The above-described calorimetric sensor designs have relied upon the use of two or more thermocouples to produce electrical voltages that are indicative of the temperature of the uncatalyzed member(s) and catalyzed member(s) of our sensor. The uncatalyzed member voltage is, of course, a measure of the exhaust gas temperature at the sensor. The difference between the voltages of the catalyzed and uncatalyzed sensor members is under suitable conditions, a measure of the CO or CO+HC content of the exhaust gas. However, it will be appreciated that other electrical means may be adopted to reflect the temperature of the sensor members. For example, electrical resistance measurements of the members may be preferred.

It will also be recognized that the nature of the catalyst may be selected to receive specific results in sensing exhaust gas conditions. For example, instead of using a high surface area alumina ceria mixture, a high surface area tin oxide may be used as the washcoat material. Such a material in combination with a dispersion of platinum metal is more specifically sensitive to carbon monoxide. Thus, where specific data for carbon monoxide is desired, the preparation of a specific sensor with an $SnO_2$-based washcoat may be employed. Such a tin oxide supported noble metal catalyst is active at low temperatures and can provide data specific for carbon monoxide even at relatively low operating temperatures. The data from the sensor may then be adapted for management by the engine computer to provide notices to the driver as required.

While our invention has been described in terms of certain specific embodiments thereof, it will be appreciated that other forms could readily be adapted by one skilled in the art. Accordingly, the scope of our invention is to be considered limited only by the following claims.

The embodiments of the invention in which an exclusive property or privilege is claimed are defined as follows:

1. A method of diagnosing the performance of an on-board catalytic converter for the oxidation of carbon monoxide (CO) and unburned hydrocarbons (HC) in the exhaust stream of an operating automotive vehicle powered by a hydrocarbon or alcohol fuel and on which vehicle the engine fuel supply is managed by operation of on-board computer means, comprising producing an electrical signal from a calorimetric sensor located in the exhaust stream flow of said vehicle downstream from said converter, said sensor comprising a first element bearing an oxidation catalyst for CO and HC and an adjacent second element that is oxidation catalyst-free but otherwise substantially identical in mass and exhaust stream profile to the first element, the electrical signal being directly related to a temperature difference between said elements, monitoring vehicle engine air-to-fuel ratio, said calorimetric sensor temperature and exhaust gas flow rate in said computer means, and reading said sensor signal in said computer means for diagnosis of the oxidative performance of said converter only when said parameters are of predetermined values productive of a signal useful for said diagnosis.

2. A method of diagnosing the performance of an on-board catalytic converter for the oxidation of carbon monoxide (CO) and unburned hydrocarbons (HC) in the exhaust stream of an operating automotive vehicle powered by a gasoline-fueled engine and on which vehicle the engine fuel supply is managed by operation of on-board computer means, comprising producing an electrical signal from a calorimetric sensor located in the exhaust stream flow of said vehicle downstream from said converter, said sensor comprising a first element bearing an oxidation catalyst for CO and HC and an adjacent second element that is oxidation catalyst-free but otherwise substantially identical in thermal mass and exhaust stream profile to the first element, the electrical signal being directly related to a temperature difference between said elements, monitoring vehicle engine air-to-fuel ratio, said calorimetric sensor temperature and exhaust gas flow rate in said computer means, and reading said sensor signal in said computer means for diagnosis of the oxidative performance of said converter only when said air-to-fuel ratio is at or lean with respect to the stoichiometric ratio, the exhaust gas temperature at said sensor is in the range of 300° C. to 450° C. and the exhaust flow is at an above engine idle flow rate.

3. A method of diagnosing the performance of an on-board catalytic converter for the oxidation of carbon monoxide (CO) and unburned hydrocarbons (HC) in the exhaust stream of an operating automotive vehicle powered by a hydrocarbon or alcohol fuel and on which vehicle the engine fuel supply is managed by operation of on-board computer means, comprising operating the vehicle at a steady cruise speed in an engine and exhaust warmed-up condition and at an engine air-to-fuel ratio at or lean of the stoichiometric air-to-fuel ratio, producing an electrical signal from a calorimetric sensor located in the exhaust stream flow of said vehicle downstream from said converter, said sensor comprising a first element bearing an oxidation catalyst for CO and HC and an adjacent second element that is oxidation catalyst-free but otherwise substantially identical in mass and exhaust stream profile to the first element, the electrical signal being directly related to a temperature difference between said elements, and reading said sensor signal in said computer means for diagnosis of the oxidative performance of said converter only during said operating step.

4. A method of diagnosing the performance of an on-board catalytic converter for the oxidation of carbon monoxide (CO) and unburned hydrocarbons (HC) in the exhaust stream of an operating automotive vehicle powered by a hydrocarbon or alcohol fuel and on which vehicle the engine fuel supply is managed by operation of on-board computer means, comprising producing an electrical signal from a calorimetric sensor located in the exhaust stream flow of said vehicle downstream from said converter, said sensor comprising a first element bearing an oxidation catalyst for CO and HC and an adjacent second element that is oxidation catalyst-free but otherwise substantially identical in mass and exhaust stream profile to the first element, said first and second elements each comprising a particulate metal oxide washcoat carried on an alumina whisker-bearing, aluminum-containing stainless steel foil, the electrical signal being directly related to a temperature difference between said elements, monitoring vehicle engine air-to-fuel ratio, said calorimetric sensor temperature and exhaust gas flow rate in said computer means, and reading said sensor signal in said computer means for diagnosis of the oxidative performance of said converter when said parameters are of predetermined values productive of a signal useful for said diagnosis.

5. A method as recited in claim 4 in which said particulate metal oxide washcoat comprises a thermally stable, high surface area alumina.

6. A method as recited in claim 4 in which said particulate metal oxide comprises tin oxide.

7. A method as recited in claim 1 in which said first and second elements are each electrically connected to separate thermocouples and in which method the exhaust gas temperature is taken as the thermocouple-produced voltage at said second element and said electrical signal is the difference between the thermocouple voltages of said first and second elements, respectively.

* * * * *